(12) United States Patent
Porath

(10) Patent No.: US 8,047,501 B2
(45) Date of Patent: Nov. 1, 2011

(54) DEVICE FOR CONTROLLING THE SWITCHING MOVEMENT OF A VALVE

(75) Inventor: Bernd Porath, Breitenfelde (DE)

(73) Assignee: Tuchenhagen GmbH, Büchen (DE)

( * ) Notice: Subject to any disclaimer, the term of this patent is extended or adjusted under 35 U.S.C. 154(b) by 1037 days.

(21) Appl. No.: 11/884,028

(22) PCT Filed: Jan. 16, 2006

(86) PCT No.: PCT/EP2006/000305
§ 371 (c)(1), (2), (4) Date: Aug. 9, 2007

(87) PCT Pub. No.: WO2006/084541
PCT Pub. Date: Aug. 17, 2006

(65) Prior Publication Data
US 2009/0121169 A1 May 14, 2009

(30) Foreign Application Priority Data
Feb. 10, 2005 (DE) .......................... 10 2005 005 955

(51) Int. Cl.
*F16K 31/12* (2006.01)
(52) U.S. Cl. ................................. 251/30.04; 251/129.04
(58) Field of Classification Search .............. 251/129.04, 251/30.01, 30.04; 137/554, 556, 625.64; 702/33, 64, 113–115, 138, 140
See application file for complete search history.

(56) References Cited

U.S. PATENT DOCUMENTS

| 4,171,152 A * | 10/1979 | Geiseler ........................ 439/752 |
| 4,683,454 A | 7/1987 | Vollmer et al. |
| 5,459,631 A * | 10/1995 | Leone et al. .................... 361/154 |
| 6,106,307 A | 8/2000 | Goslicki, Jr. et al. |
| 6,468,092 B1 | 10/2002 | Gräff et al. |
| 2003/0220717 A1* | 11/2003 | Underwood et al. ......... 700/282 |
| 2004/0211928 A1* | 10/2004 | Coura et al. ............. 251/129.04 |
| 2005/0139274 A1* | 6/2005 | Patel ........................ 137/625.64 |

FOREIGN PATENT DOCUMENTS

| EP | 0 380 234 A | 8/1990 |
| WO | 02/093058 A | 11/2002 |

* cited by examiner

*Primary Examiner* — John Fristoe, Jr.
*Assistant Examiner* — Marina Tietjen
(74) *Attorney, Agent, or Firm* — Merek, Blackmon & Voorhees, LLC

(57) ABSTRACT

The invention relates to a device for controlling the switching movement of a valve according to the preamble of claim 1. It is the object of the present invention to design a control device in this regard such that it can be largely prefabricated and can be very easily converted to different operating voltages or data protocols, that the stock inventory of these control devices can be reduced and that economical quantities can be achieved more easily than before. This is achieved in that an internal control unit (2) of the control device (1) comprises a standardized operating voltage ($U_B$), that also the pilot valve(s) (5) operates (operate) with the standardized operating voltage, that an adapting module (I; I*) is accommodated in the control device (1), which is connected with the internal control unit (2) through an internal interface (B), that the respective signal structure of the control unit (2) and of the adapting module (I; I*) are equal at the internal interface (B), and that the internal control unit (2) is supplied with voltage through the adapting module (I; I*).

Figure 1:
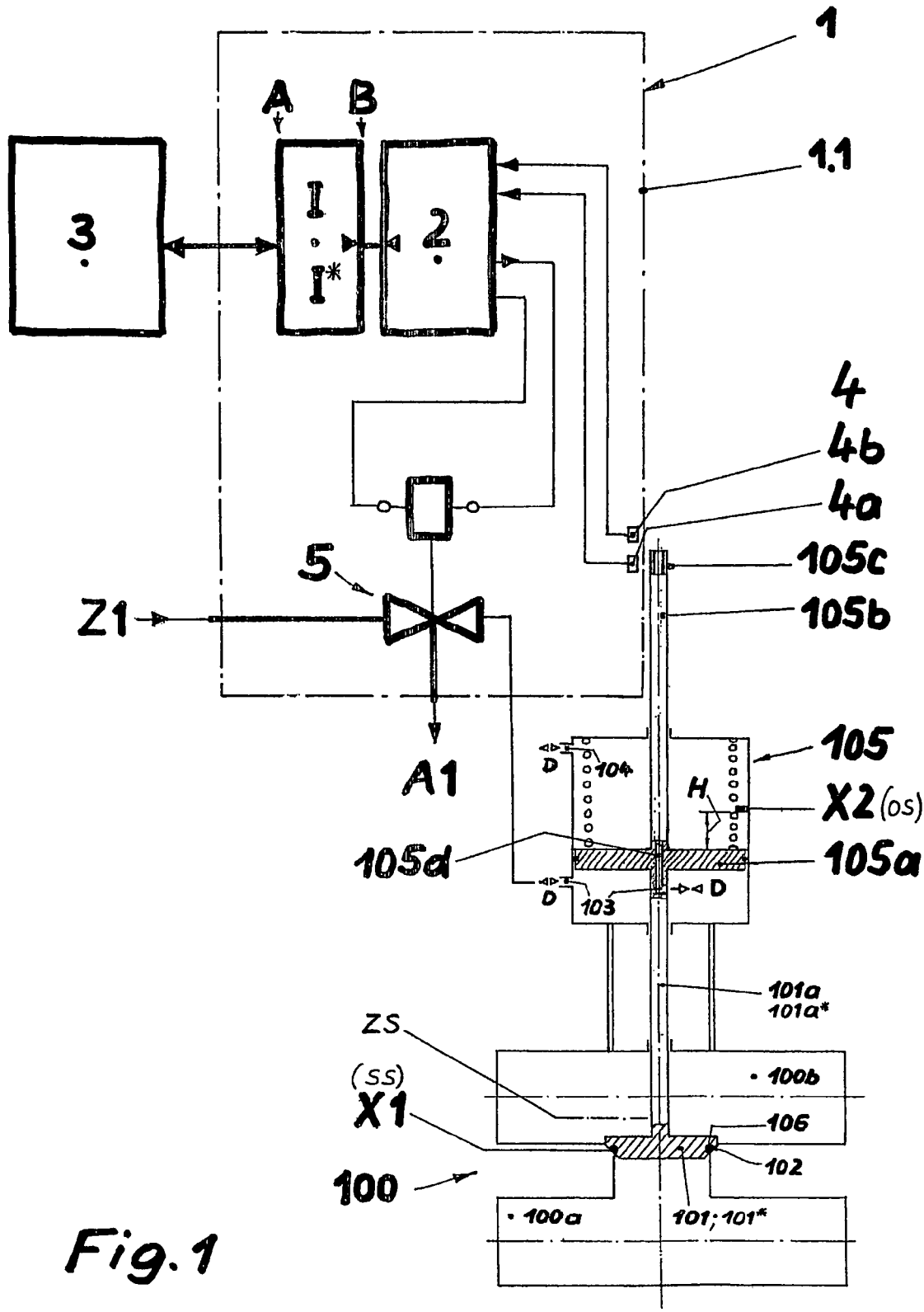

11 Claims, 3 Drawing Sheets

DEVICE FOR CONTROLLING THE SWITCHING MOVEMENT OF A VALVE

CROSS-REFERENCE TO RELATED APPLICATION

The present application claims the priority under 35 U.S.C. 119 of German Application No. 10 2005 005 955.4, filed Feb.10, 2005, which is hereby incorporated herein by reference in its entirety.

TECHNICAL FIELD

The invention relates to a device for controlling the switching movement of a valve, wherein: the control device has a modular structure and the valve comprises at least one valve rod, which supports a closure member and is moved in translative or rotative manner, the valve rod(s) is/are brought into two end positions, i.e. a closed and an open position by means of a valve actuator acted upon by a pressure medium, if necessary at least one valve rod is brought into an intermediate position positioned between these end positions and forming a partially open position of the associated closure member, the control device comprises means for controlling the pressure medium for the valve actuation as well as a position indicator, which detects at least the end position and, if applicable, the intermediate position of the valve rod with regard to a fixed reference system and supplies actual position indications relating thereto, and the control device comprises a modular, internal control unit, which exchanges data with an external control until in the surrounding of the valve on the one hand, and drives the means for controlling the pressure medium on the other hand.

PRIOR ART

A device for controlling the switching movement of a valve, wherein the shifting movement of the valve rod is continuously monitored by an odometrical system, and fixed valve positions, such as the completely open position or the closed position, are detected, is known from WO 02/093 058 A1. In this the device comprises means for controlling the pressure medium for a valve actuator, furthermore a position detector or indicator, respectively, which is connected to the valve rod and continuously detects the actual position of the valve rod depicting the valve rod movement with regard to a fixed reference system and supplies actual position indications relating thereto, means for the continuous storage of the actual position indications, and above that means for the calculation and comparison of data from predetermined data and/or data gathered in the course of the valve movements. In this the position indicator is formed as a contact-less operating position display device and all means required for the control of the valve are arranged in a control head provided at the side of the valve actuator averted from the valve housing.

Furthermore, devices for controlling the switching movement of a valve facilitated with regard to the above prior art are known, in which a continuous path measurement of the valve rod can be dispensed with and only discrete, fixed valve positions at the respective valve in question are detected through position indicators and are reported back to an internal and/or external control of the valve. In this the position indicators detect the respective position of the valve rod either contacting or contact-less. As contact-less operating position indicators for example those operating magnetically are known, which generate a switching signal when a permanent magnet attached to the valve rod reaches the vicinity of the position indicator detecting a magnetic field, for example.

The above devices for controlling the switching movement of a valve, below indicated as control devices in short, are constructed basically such that an internal control unit is provided inside a control head arranged at the valve actuator, which performs data exchange with an external control unit, for example a memory-programmable control (SPS), on the one hand, and actuates means for controlling a pressure medium, so-called pilot valves, on the other hand, which are provided for the supply of the valve actuator with this pressure medium. In this the internal control unit is configured such with regard to voltage that the pilot valve can be actuated with the control voltage, upon which it is based on the one hand, and also a communication with the external control unit (SPS) is possible. In Germany, for example, an operating voltage of 24 Volt DC (24 VDC) has largely been established.

The external control units (SPS) are operated in Germany, but mainly abroad, with alternating voltages in the range from 20 to 130 Volt (20-130 VAC) as well. If the pilot valves are operated with a voltage different to 24 VDC above that, solutions are required, which are especially adapted to these voltage conditions considering the internal control unit such that the latter can communicate in the direction of the external control unit (SPS) on the one hand and of the pilot valves on the other hand.

From this ensues a variety of different internal control units up to now as a result of the different operating voltages indicated above and also as a result of the given varying data exchanges. Such a condition is unsatisfactory, as a relatively large effort is required for the respective arrangement or rearrangement of the valve controls. A prefabrication of multiple layout variants implies a high stock of inventory, if one wants to be prepared for all variants indicated above. A reduction of this inventory results in uneconomical production of small batch sizes. Furthermore, such a multiplicity of layout variants of the control device implies that a corresponding developing effort is required, that the stock keeping is extensive with regard to the inventory management (code numbers) and that each layout variant must be subject to a high-cost approval examination.

The number of the above layout variants is even increased, when, as this is common practice in many cases, the internal control unit communicates by means of a two-core BUS line through a so-called AS-interface module, i.e. through binary signals, with the external control unit (SPS).

In U.S. Pat. No. 4,683,454 A an electromagnetic operating mechanism with an electric adapting module is disclosed, which actuates a valve for the control of fluids. The adapting module respectively utilised connects the internal electrical control unit of the electromagnetic operating mechanism with an external power supply system, which can be available in the most different form. In this the respective adapting module implements especially the adaptation of the electromagnetic operating mechanism to the respective contacting system of the external power supply system. The adapting module can also provide means for conversion and adaptation of external voltages (direct and alternating voltages) to the internally required voltage of the electromagnetic operating mechanism. In this the closure member of the valve engages with a shaft-like end into the electrical coil systems of the electromagnetic operating mechanism and is directly actuated thereby. Pilot valves for controlling a pressure medium are therefore not required. The known electromagnetic operating mechanism does not have a position indicator in connection with the valve for the detection of end or intermediate positions of the valve.

It is the object of the present invention to design a device of the generic type such that it can be largely prefabricated and is very easily convertible to different operating voltages or data protocols.

SUMMARY OF THE INVENTION

This object is solved by the features of claim 1. Advantageous embodiments of the device according to the invention are the subject matter of the subordinated claims.

Herein the inventive principle idea consists in that all possible layout variants of the control device, which are predetermined by different operating voltages and/or data protocols, are operated by a standardised internal control unit, a so-called base unit, which comprises a standardised operating voltage. This internal control unit also controls the means for controlling the pressure medium configured as pilot valves with this standardised operating voltage. The internal control unit can be prefabricated jointly with the pilot valve or jointly with up to three pilot valves independently of the respective operating voltage of the external control unit.

A second inventive principle idea is to place the adaptation to the respective operating voltage of the external control unit (for example SPS) or to the data communication therewith, respectively, in an adapting module, which is connected with the internal control unit through an internal interface. In this regard the adapting module is configured such that the respective signal structure of the control unit and of the adapting module is the same at the internal interface. Furthermore, the internal control unit is supplied with voltage through the adapting module.

The inventive control device is not only applicable to lift valves, wherein a single, translatory moved closure member works against an associated seat surface, but it is also applicable to so-called double seat valves with two closure members operable independently from each other, which enclose in the closed as well as in the open position of the double seat valve a leakage cavity between them, which is connected at least through a connecting path with the surrounding of the double seat valve. In this each closure member is connected with an associated valve rod and at least one of these valve rods, preferably that of the independently operable closure member, is monitored by the position indicator of the control device according to the invention regarding its respective position in connection with the associated closure member (closed position, open position, intermediate position).

Above that the control device according to the invention is also applicable to valves, in which the closure member performs a rotative opening and closing movement (for example disk valves). Here the rotative movement of the valve rod associated with the respective closure member can be directly controlled and monitored by the inventive control device on the one hand. On the other hand, however, the rotative movement can also be indirectly controlled and monitored in that an associated valve actuator producing the rotative valve rod movement is controlled and monitored. In this valve actuator the rotative movement of the closure member and of the associated valve rod is generated as a rule by a translatory, reciprocating movement of a piston acted upon by pressure medium, wherein it is easier to control and monitor this translatory movement than a rotative one.

An advantageous embodiment of the control device according to the invention envisages that the internal control unit operates with a standardised operating voltage of 24 VDC (direct voltage). With this standardised operating voltage of 24 VDC the standard cases of use can be covered and the internal control unit can perform direct data exchange with the external control unit through the internal interface.

According to a further proposal, a first adapting module is implemented as a so-called AC-interface Module, which converts the signals and the signal level of the internal control unit working with the standardised operating voltage to any predetermined operating voltage in the range from 20 to 130 VAC (alternating voltage) and provides it to an external interface, through which it is connected with the external control unit, and performs a corresponding conversion in the opposite direction as well. Thereby the standardised internal control unit can communicate through the first adapting module with any external control unit, which is operated in the range from 20 to 130 VAC. The required adaptation steps are placed in the modularly structured first adapting module and thus do not have any influence on the configuration and layout of the standardised internal control unit.

Furthermore, a second adapting module, a so-called AS-interface Module is proposed, which converts the signals and signal level of the internal control unit operating with the standardised operating voltage to the corresponding signals and the signal level of an AS-interface BUS data transmission system working with a two-core BUS line and provides them at an external interface, through which it is connected with the external control unit, and also performs a corresponding conversion in the opposite direction. Also in this solution, wherein the data exchange between the standardised internal control unit and the external control unit occurs through a two-core BUS line now, the adapting measures are provided in the modularly structured second adapting module such that the standardised internal control unit can be utilised in this case as well.

Above that the inventive principle ideas can also be transferred to further BUS solutions and further alternating or direct voltages, by which the external control units are operated, if applicable, wherein the standardised internal control unit described above can be utilised in any case.

The different modular configurations of the control device according to the invention can be implemented especially easily, if, as this is further proposed, the external interface and the internal interface are each formed as a terminal strip. In this the second terminal strip is advantageously embodied as a blade connector strip, wherein according to the further proposal the contact pins of the blade connector strip are provided at the adapting module.

If, as this is envisaged by a further proposal, the contact pins are each fixed in an associated screw terminal at the internal control unit, a safe connection between the adapting module and the internal control unit is obtained only by this contacting, which have to be connected with each other for the absolutely safe connection of these two modular components only through one single frictional connection, for example a single screw connection at a suitable location thereafter.

AC-Interface Module (First Adapting Module)

The AC-interface module serves for the signal adaptation for the exchange of control signals to electronic modules of the internal control unit, which co-operate with (preferably pneumatic) operating mechanisms acted upon by pressure medium. The internal control unit consists of an electronic unit based on a standardised operating voltage, for example a direct voltage of 24 VDC, which receives control signals and supplies signals for monitoring purposes. Above that the internal control unit requires the standardised operating voltage, in the present case a direct voltage of 24 VDC.

With regard to equipment the above inventive idea is implemented in that the AC-interface module, the first adapting module, is coupled to the also modularly formed internal control unit. In the AC-interface module occurs the conversion of any alternating voltage in the range from 20 to 130 Volt to the signal level of the internal control unit (base unit) operating with 24 VDC, in order to provide for the actuation of the 24 VDC pilot valves. The feedback signals for the discrete valve positions (closed position, completely open position and, if applicable, intermediate position(s)), which reach the AC-interface module through the internal control unit, are converted in turn to the input level of this module there. The user can thereby actuate pilot valves with an alternative voltage signal and receives in turn the same AC signal level (alternating voltage level) as feedback.

Details of the inventive AC-interface module are explained in connection with the FIGS. 2a and 2b of the drawings.

AS-Interface Module (Second Adapting Module)

The AS-interface module serves according to the invention as optional extension module for use in devices for controlling the switching movement of a valve, wherein the internal control unit (base unit) is standardised again and operates with a standardised operating voltage, preferably a voltage of 24 VDC (direct voltage). The AS-interface module is connected through the so-called AS-interface BUS with the AS-interface master or a Gateway. Here a two-core BUS line is used, which provides the operating voltage for the AS-interface module at the same time and is contacted through two terminals at the AS-interface module. The coupling of the AS-interface module to the internal control unit occurs in the same manner as has been described above in connection with the AC-interface module, that is through the internal interface.

In the normal case, when the internal control unit directly communicates with the external control unit, the connecting terminals of the internal control unit are connected by corresponding lines to the external control unit for signal transmission, through which lines the 24 VDC binary signals reach this external control unit (SPS) then.

In case of an upgrading of the external control unit with an AS-interface module, only the lines to the external control unit (SPS) must be removed and the corresponding AS-interface module is to be contacted at the same location. This implies that the standardised internal control unit only has one interface for signals, which reach the external control unit (SPS) either on the direct way or, in case that the AS-interface module is coupled thereto, that these signals are converted in the AS-interface module to the AS-interface data protocol, such that a communication with an AS-interface master is possible through the data wire.

The E/O interface (input/output interface) of the AS-interface module is electrically connected with the standardised internal control unit through a blade connector strip. Through this interface digital output signals from the AS-interface module are transferred to the internal control unit as well as digital output signals of the internal control unit to the AS-interface module. Above that, the AS-interface module supplies the internal control unit with the operating voltage.

Details of the inventive AS-interface module as described in connection with the FIGS. 3a and 3b of the drawing.

The advantages of the alternative inventive solutions proposed above (AC-interface module, AS-interface module) are summarised in short below:

1. Instead of a plurality of special internal control units, either an AC-interface module or, if a data transmission by means of a data bus is intended, an AS-interface module is coupled to a standardised internal control unit usable for all applications, which preferably operates with a standardised operating voltage of 24 VDC.
2. From the configuration relating to 1. arises a reduction of development measures, furthermore within the scope of stock keeping a reduction of the components' code numbers of the control device in question, a reduction of required approval examinations as well as a reduction of the capital commitment in the warehouse.
3. By utilisation of the standardised internal control unit (standardised operating voltage; 24 VDC module as base unit) a preassembly of the control device formed as a control head is possible.
4. By connection of the AS-interface module to an internal interface, which comprises a defined signal structure and thus quasi becomes a manufacturer-specific standard interface, an upgrade to an AS-interface BUS is possible.
5. By connection of the AC-interface module to the standardised internal interface mentioned under item 4, an upgrade to an AC-capability for long-range operation is possible.
6. By the use of only one pilot valve (24 VDC), other pilot valve types (24 Volt AC-pilot valve, 115 Volt AC-pilot valve) can be dispensed with in stock keeping and use.
7. A conversion from 24 VDC standard operation to AC-interface or AS-interface BUS operation does not require any readaptation of the feedback to the valves equipped with the control device, but only a coupling of the corresponding interface module to the standardised internal interface.
8. By fixed contact assignment at the interface modules, interchanging of signals is not possible.

SHORT DESCRIPTION OF THE DRAWINGS

Figure 2A:
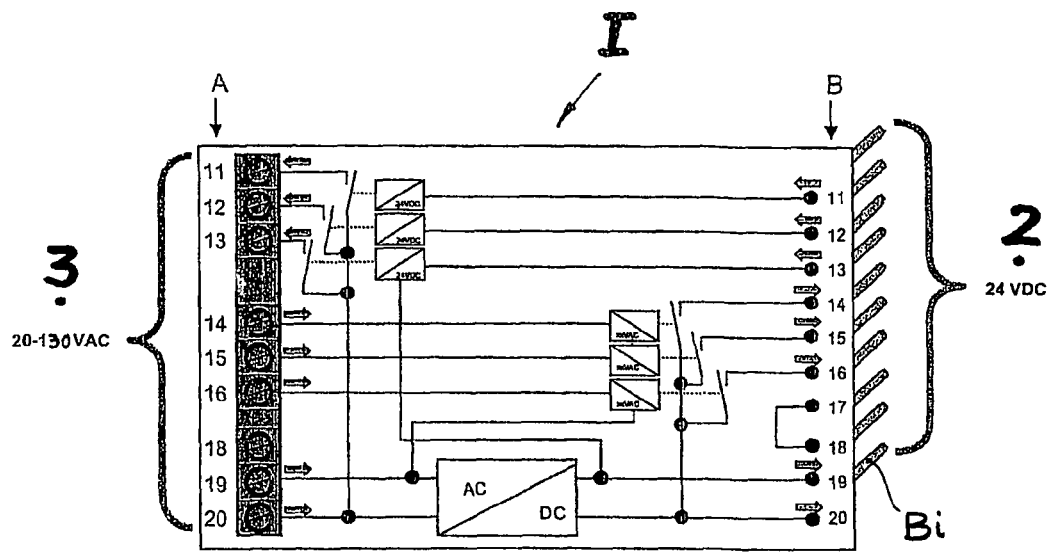
Figure 2B:
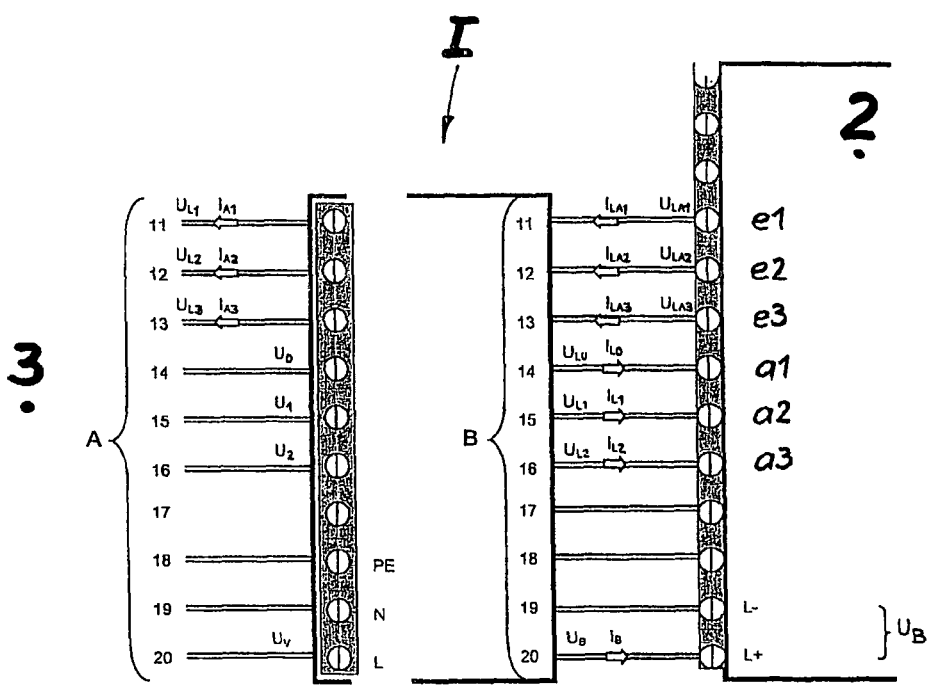
Figure 3A:
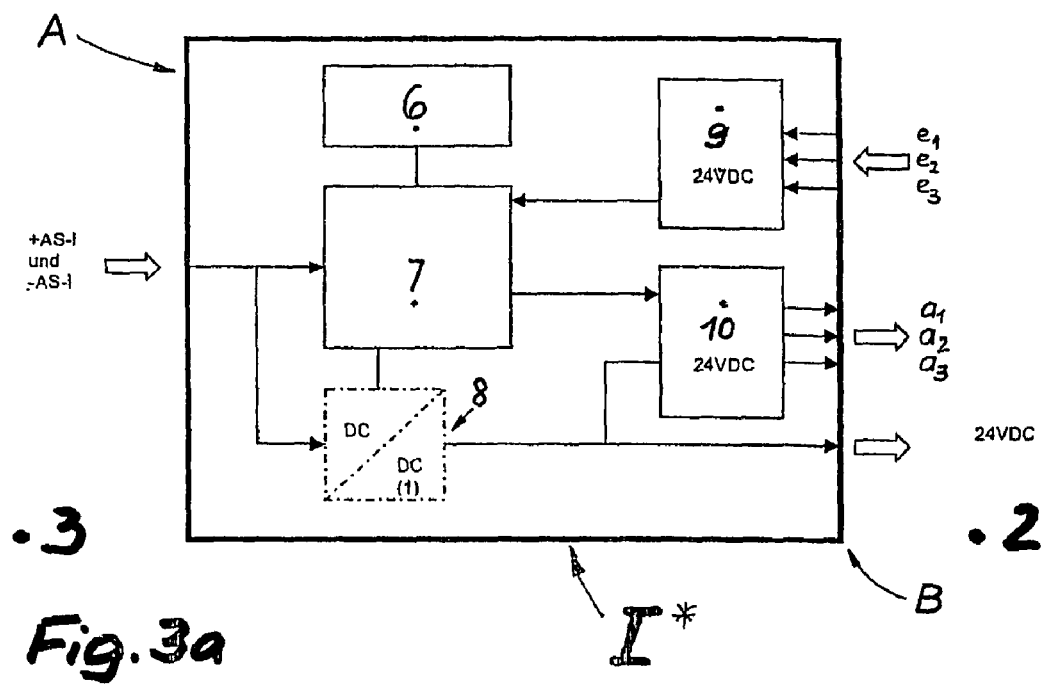
Figure 3B:
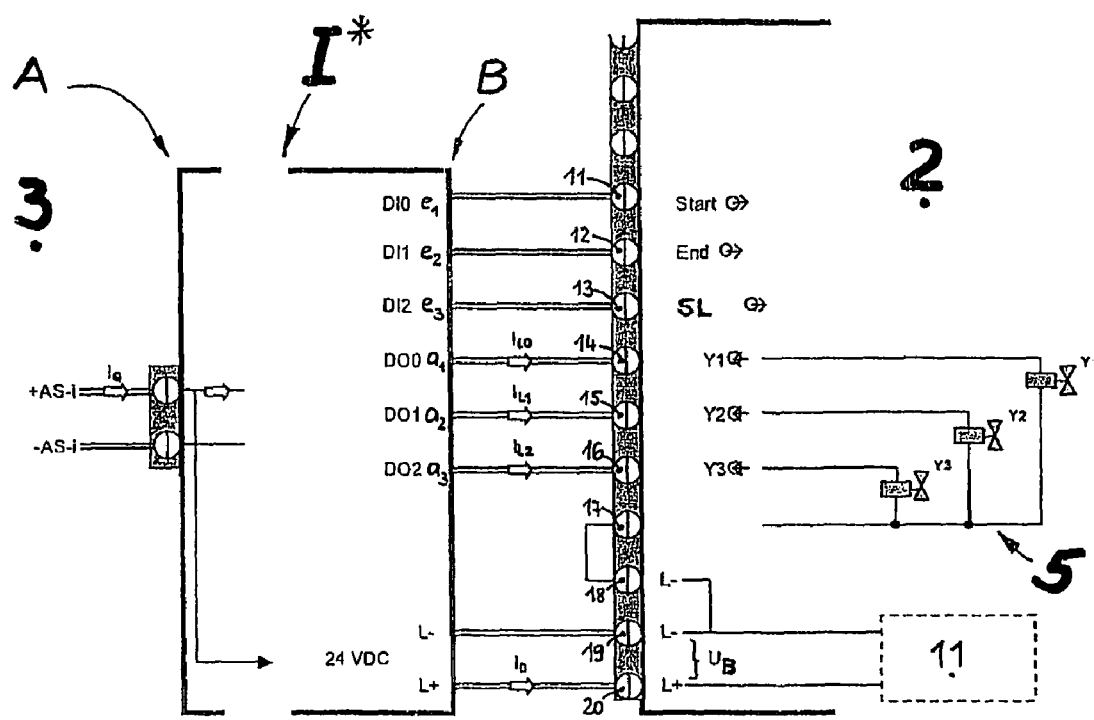

Embodiment examples of the invention are illustrated in the figures of the drawings and are described below. It is shown in FIG. 1 a schematic diagram of an ordinary valve chosen by way of example comprising a pneumatic actuator in connection with a control device according to the invention, wherein the latter can be equipped either with an AC-interface module or an AS-interface module;

FIG. 2a a schematic diagram of a basic circuit diagram of the inventive AC-interface module as it is indicated in FIG. 1;

FIG. 2b a schematic diagram of the AC-interface module according to FIG. 2a in its coupling state to an internal control unit on the one side and to a external control unit on the other side;

FIG. 3a a schematic diagram of the basic circuit diagram of an inventive AS-interface module as it is indicated in FIG. 1; and FIG. 3b the coupling of the AS-interface module according to FIG. 3a to an internal control unit on one side and to a data bus system on the other side.

DETAILED DESCRIPTION

A control device 1 according to the invention (FIG. 1) includes in a housing unit 1.1, an internal control unit 2, a position indicator 4 consisting of a first and a second position indicator 4a, 4b, and means 5 (pilot valve) for controlling a pressure medium D. For the case that the internal control unit 2 directly communicates with an external control unit 3 (a memory-programmable control (SPS), for example), the configuration just described is prior art and serves for controlling the switching movement of a valve 100, which is designed as a lift valve in the illustrated embodiment example. The latter accommodates a closure member 101 between a first and a second valve housing 100a or 100b, respectively. This is actuated through a valve rod 101a connected to an actuator 105b, a valve rod extended upwards, to which a permanent magnet 105c is attached. The closure member 101 co-operates with a seat surface 102 through a seat seal 106, it controls a connecting bore not designated between the first and the second valve housing 100a or 100b, respectively, and it has a first fixed valve position, the illustrated closed position SS, and a second fixed valve position, the open position OS. Between these two fixed valve positions, the two end positions, a so-called full stroke H of the closure member 101 is formed.

Above that the closure member 101 can also be brought into a partially open position, an intermediate position ZS, if required.

Besides the valve indicated above with a single closure member 101, a so-called ordinary valve, the inventive control device 1 can also be applied to a so-called double seat valve comprising two closure members operable independently from each other, the closure member 101 and a second closure member 101*, which are operated through associated valve rods, the valve rod 101a for the closure member 101 and a second valve rod 101a* for the second closure member 101*.

In order to implement the full stroke H of the two valve types indicated above, a piston 105a connected through the valve rod 101a with the independently actuated closure member 101 in a valve actuator 105 is acted upon with the pressure medium D through a first pressure medium connection 103 either from outside of the valve actuator 105 or through a bore 105d from the inside thereof, said bore 105d terminating through connecting paths not illustrated into the interior of the housing unit 1.1 and being connected through the pilot valve 5 with a pressure medium supply Z1 there.

The defined first end position of the closure member 101 in its closed position SS, the first fixed valve position, is effected by its metallic abutment on the associated seat surface 102. The latter forms a fixed first position limitation X1 (first metallic stop). The open position OS of the valve disk 101, the second end position and thereby the second fixed valve position, is implemented for example, as schematically illustrated, by abutment of the piston 105a to a second position limitation X2 in the valve actuator 105 (second metallic stop). The two end positions, the shown closed position SS and the completely open position OS, are detected by the first position indicator 4a or the second position indicator 4b, respectively, and fed back to the internal control unit 2.

The latter actuates the pilot valve 5, through which the pressure medium D from the pressure medium supply Z1 reaches a space within the valve actuator 105 below the piston 105a. It is in the present case a so-called spring closing valve actuator 105, which displaces the pressure medium D through the pilot valve 5 and a pressure medium discharge A1 out of the space below the piston 105a, when the pilot valve 5 is not actuated.

Above that it is envisioned in the shown embodiment, to press the valve disk 101 in the not actuated condition onto its seat surface by means of an additional force. For this purpose, the piston 105a is acted upon by pressure medium D through a second pressure medium connection 104 on the rear side.

The actuation of the second pressure medium connection 104 occurs through a so-called NOT-gate, which is actuated in case of need always, when no actuation of the piston 105a through the first pressure medium connection 103 occurs. The NOT-gate, not illustrated, is also actuated by the internal control unit 2.

The control device 1 described above, which forms the prior art, requires a respectively specially formed internal control unit 2, if the latter operates with a different operating voltage than the external control unit 3, which it is connected to and performs data exchange with. Corresponding further adaptation measures are required, if the pilot valve 5 comprises an operating voltage deviating from the 24 VDC standard.

This is were the inventive solution starts by providing the adaptation measures not in the internal control unit 2, but either in the first adapting module I, a so-called AC-interface module, or alternatively, when a data bus system is provided, in a second adapting module I*, a so-called AS-interface module. The AC- or the AS-interface module I or I*, respectively, is coupled through an internal interface B, a second terminal strip, to the internal control unit 2 on the one side, and through an external interface A to the external control unit 3 (cf. also FIGS. 2a, 2b and 3a, 3b) on the other side.

AC-Interface Module I (First Adapting Module)

The housing for the AC-interface module I (first adapting module) (FIG. 2a) has preferably a substantially cuboid configuration, which comprises possibly small dimensions and completely encloses the electronics. The attachment of the AC-interface module I at the internal control unit 2 is implemented by a lug with a bore arranged at the module such that a positively fitting connecting can be created between these two components for example by screw connection. The external wiring (connection from the external control unit 3a (for example a SPS to the AC-interface module I) is laid at the latter on the first terminal strip A. The connection from the AC-interface module I to the internal control unit 2 occurs through the second terminal strip B formed as a blade connector strip, wherein contact pins Bi of the blade connector strip B are directly pushed into the terminals arranged at the internal control unit 2 and are bolted there. The first terminal strip A and the second terminal strip B each comprise terminals 11 to 20, the assignment or use of which can be gathered from FIG. 2b. The terminals 11 to 13 are assigned to the inputs $e_1$, $e_2$ and $e_3$ for the feedback of the fixed valve positions (closed position SS, open position OS and, if applicable, intermediate position ZS). The terminals 14 to 16 are provided for the outputs $a_1$, $a_2$ and $a_3$ leading to the pilot valves Y1, Y2 and Y3.

1. The Electrical Parameters for the Second Terminal Strip B are the Following:

| | |
|---|---|
| Connecting terminal | Blade connector strip |
| Operating voltage for control unit 2 (L+, L−) | $U_B = 24$ VCD (18-30 VDC) |
| Operating current for control unit 2 | $I_B$ |
| Control current | $I_L$, simultaneity factor max. 2 ($I_{L0} = I_{L1} = I_{L2}$) |
| Signal current | $I_{LAx} = I_{LA1} = I_{LA2} = I_{LA3}$ |
| Actuating voltage | $U_{Lx} = U_{L0} = U_{L1} = U_{L2} = 24$ VDC |
| Signal voltage | $U_{Lax} = U_{LA1} = U_{LA2} = U_{LA3}$ |

All voltage potentials for the second terminal strip B are related against L−.

2. The Electrical Parameter for the First Terminal Strip A are the Following:

| | |
|---|---|
| Connecting terminal | screw terminals |
| Operating voltage | $U_V = 20$-130 VAC (between neutral conductor N and live line L) |
| Actuating voltage | $U_x = U_0 = U_1 = U_2$ |
| Signal voltage | $U_{Lx} = U_{L1} = U_{L2} = U_{L3}$ |
| Ampacity | $I_{Ax} = I_{A1} = I_{A2} = I_{A3}$ (simultaneity factor max. 2) |

All voltage potentials for the first terminal strip A are related against the neutral conductor N; the protective conductor is designated with PE.

AS-Interface Module I* (Second Adapting Module)

The construction of the AS-interface module I* (second adapting module) can be gathered from FIG. 3a in principle. It comprises substantially an address memory 6, an AS-i chip 7, a voltage converter 8, an input level 9 (24 VDC) and an output level 10 (24 VDC). Related to the positioning in the drawing the AS-interface module I* is connected with the internal control unit 2 on the right hand side (internal control unit B) and on the left hand side (external control unit A) through the so-called BUS connections by means of the two-core BUS line (+AS-i and −AS-i) with the external control unit 3. It can be seen as well that the AS-interface module I* viewed from the internal control unit 2 comprises three inputs $e_1$, $e_2$ and $e_3$ for feedbacks from the positions of the valve (terminals 11 to 13) and that it is connected through three outputs $a_1$, $a_2$ and $a_3$ for the pilot valves 5 (Y1, Y2, Y3) with the internal control unit 2 (terminals 14 to 16). Above that the internal control unit 2 is supplied by the AS-interface module I* with $U_B$=24 VDC operating voltage; furthermore, electronics of a sensor system 11 of the internal control unit 2 are connected at the terminals 19 and 20 supplied with the operating voltage $U_B$ (cf. FIG. 3b). The remaining terminal assignment of the internal interface B can be seen in FIG. 2b.

The logical assignment of the inputs and outputs and of the connecting terminals can been seen in FIG. 3b:

Input $e_1$ (data bit DI0) at ASI module<-connecting terminal 11 (Start->)

Input $e_2$ (data bit DI1) at ASI module<-connecting terminal 12 (End->)

Input $e_3$ (data bit DI2) at ASI module<-connecting terminal 13 (seat cleaning SL->)

Output $a_1$ (data bit DO0) from ASI module-> (connecting terminal 14 (Y1<-)

Output $a_2$ (data bit DO1) from ASI module-> (connecting terminal 15 (Y2<-)

Output $a_3$ (data bit DO2) from ASI module-> (connecting terminal 16 (Y3<-).

The Electrical Parameters of the AS-Interface Module I* are the Following:

1. Bus Connection

| Connecting terminal | +AS-i/−AS-i (according to ASI spec.) |
|---|---|
| Total current draw | $I_G$ |

2. Inputs $e_1$ to $e_3$ for Valve Feedbacks from the Internal Control Unit 2

| Signal level | 24 VDC |
|---|---|

3. Outputs $a_1$ to $a_3$ for Pilot Valve Actuations to the Internal Control Unit 2

| Signal level | 24 VDC |
|---|---|
| Simultaneity factor | max. 2 outputs simultaneously |

4. Operating Voltage for Internal Control Unit 2

| Voltage level | $U_B$ = 24 VDC (18-30 VDC) |
|---|---|
| Ampacity | $I_B$ |

LIST OF REFERENCE NUMBERS OF THE USED ABBREVIATIONS

| | FIG. 1 |
|---|---|
| 1 | Control device |
| 1.1 | Housing unit |
| 2 | internal control unit |
| 3 | external control unit (for example memory-programmable control) |
| 4 | position indicator |
| 4a | first position indicator |
| 4b | second position indicator |
| 5 | means for controlling the pressure medium D (pilot valve(s)) |
| I | first adapting module (AC-interface module) |
| I* | second adapting module (AS-interface module) |
| 100 | valve (lift valve) |
| 100a | first valve housing |
| 100b | second valve housing |
| 101 | closure member |
| 101* | second closure member |
| 101a | valve rod |
| 101a* | second valve rod |
| 102 | seat surface |
| 103 | first pressure medium connection |
| 104 | second pressure medium connection |
| 105 | valve gear |
| 105a | piston |
| 105b | actuator/valve rod |
| 105c | magnet/permanent magnet |
| 105d | bore (within the valve rod 101a) |
| 106 | seat seal |
| A1 | pressure medium discharge |
| A | external interface (first terminal strip) |
| B | internal interface (second terminal strip) |
| D | pressure medium |
| H | full stroke |
| OS | open position |
| SS | closed position |
| ZS | intermediate position |
| X1 | first position limitation |
| X2 | second position limitation |
| Z1 | pressure medium supply |
| | FIGS. 2a, 2b |

Terminal strip A

| L | live line (alternating voltage) |
|---|---|
| N | neutral conductor |
| PE | protective conductor |
| $I_{Ax}$ | Ampacity |
| $I_{A1} = I_{A2} = I_{A3}$ | Ampacity (simultaneity factor max. 2) |
| $U_{Lx}$ | Signal voltage |
| $U_{L1} = U_{L2} = U_{L3}$ | |
| $U_V$ | Operating voltage |
| $U_X$ | Actuation voltage |
| $U_0 = U_1 = U_2$ | |

Terminal strip B

| $a_1$ | first output (for first pilot valve Y1) |
|---|---|
| $a_2$ | second output (for second pilot valve Y2) |
| $a_3$ | third output (for third pilot valve Y3) |
| $e_1$ | first input (for first feedback) |
| $e_2$ | second input (for second feedback) |
| $e_3$ | third input (for third feedback) |
| Bi | contact pins |
| L+ | positive potential |
| L− | negative potential |
| $I_B$ | operating current for internal control unit 2 |
| $I_{Lx}$ | control current |
| $I_{L0} = I_{L1} = I_{L2}$ | control current (simultaneity factor max. 2) |

-continued

LIST OF REFERENCE NUMBERS OF THE USED ABBREVIATIONS

| | |
|---|---|
| $I_{LAx}$ | signal current |
| $I_{LA1} = I_{LA2} = I_{LA3}$ | |
| $U_B$ | operating voltage for internal control unit 2 |
| $U_{Lx}$ | actuating voltage |
| $U_{L0} = U_{L1} = U_{L2}$ | |
| $U_{Lax}$ | signal voltage |
| $U_{LA1} = U_{LA2} = U_{LA3}$ | |
| | FIGS. 3a, 3b |
| 6 | address memory |
| 7 | AS-i chip |
| 8 | voltage converter |
| 9 | input level 24 VDC |
| 10 | output level 24 VDC |
| 11 | electronics (sensor system) |
| SL | seat cleaning (intermediate position ZS) |
| Y1 | first pilot valve |
| Y2 | second pilot valve |
| Y3 | third pilot valve |
| Terminal strip A | |
| +AS-i | first bus connection (connecting terminal according to ASI specification) |
| −AS-i | second bus connection (connecting terminal according to ASI specification) |
| $I_G$ | total current draw |

The invention claimed is:

1. A control device for controlling the switching movement of a valve, wherein the control device (1) has a modular structure, and the valve (100) comprises at least one valve rod (101a; 101a*)that, supports a closure member (101; 101*) and is moved in translatory or rotative manner, the valve rod(s) (101a; 101a*) is/are brought into two end positions, a closed (SS) and an open (OS) position by means of a valve actuator (105) acted upon by a pressure medium, the control device (1) comprises means (5) for controlling the pressure medium (D) for the valve actuator (105), as well as a position indicator (4) that detects the end positions of the valve rod (101a; 101a*) with regard to a fixed reference system and supplies actual position indications relating thereto, and the control device (1) comprises a modular, internal control unit (2) that performs data exchange with an external control unit (3) in the surroundings of the valve (100) on the one hand and actuates means (5) for controlling the pressure medium (D) on the other hand, characterised in that the internal control unit (2) comprises a standardised operating voltage ($U_B$), and the means (5) for controlling operates with the standardised operating voltage ($U_B$); an adapting module (I; I*) is accommodated in the control device (1), which is connected to the internal control unit (2) through an internal interface (B), the respective signal structure of the internal control unit (2) and of the adapting module (I; I*) are equal at the internal interface (B); and the internal control unit (2) is supplied with voltage through the adapting module (I; I*).

2. A control device according to claim 1; characterised in that the standardised operating voltage ($U_B$) is 24 VDC (direct voltage).

3. A control device according to claim 1, characterised in that the adapting module comprises a first adapting module (AC-interface module) (I) that converts the signals and the signal level of the internal control unit (2) operating with the standardised operating voltage ($U_B$) to any predetermined operating voltage ($U_v$) in the range from 20 to 130 VAC (alternating voltage) and provides it at an external interface (A), through which it is connected with the external control unit (3), and also performs a corresponding conversion in the opposite direction.

4. A control device according to claim 1, characterised in that the adapting module comprises a second adapting module (AS-interface module) (I*) that converts the signals and the signal level of the internal control unit (2) operating with the standardised operating voltage ($U_B$) to the corresponding signals and the signal level of an AS-interface BUS data transmission system operating with a two-core BUS line and provides it at an external interface (A), through which it is connected with the external control unit (3), and performs a corresponding conversion also in the opposite direction.

5. A control device according to claim 1, characterised in that the external interface (A) is formed as a first terminal strip.

6. A control device according to claim 1, characterised in that the internal interface (B) is formed as a second terminal strip.

7. A control device according to claim 6, characterised in that the second terminal strip (B) is formed as a blade connector strip.

8. A control device according to claim 7, characterised in that contact pins (Bi) of the blade connector strip (B) are provided at the adapting module (I; I*).

9. A control device according to claim 8, characterised in that the contact pins (Bi) are each attached to an associated screw terminal at the internal control unit (2).

10. A control device according to claim 1, characterised in that the adapting module (I; I*) is fixed to the internal control unit (2).

11. A control device according to claim 1, characterised in that at least one valve rod (101a; 101a*) is brought into an intermediate position (ZS) located between the end positions and forms a partially open position of the associated closure member (101; 101 *), and the position indicator (4) detects the intermediate position (ZS) of the valve rod (101a; 101a*) with regard to the fixed reference system.

* * * * *